United States Patent Office 3,255,247
Patented June 7, 1966

3,255,247
HERBICIDAL α-HALO-N-NAPHTHYLACETAMIDES
John F. Olin, Ballwin, Mo., assignor to Monsanto Company, St. Louis, Mo., a corporation of Delaware
No Drawing. Filed Sept. 18, 1964, Ser. No. 397,636
9 Claims. (Cl. 260—562)

This application is a continuation-in-part of application Serial No. 134,167, filed August 28, 1961, and now abandoned.

This invention relates to the control of plant systems, including germinating seeds, emerging seedlings, and fully developed plants. In one aspect, this invention relates to valuable herbicidal compositions. In another aspect, this invention relates to methods for destroying undesirable plant vegetation without substantially affecting desirable plant vegetation. In another aspect, this invention relates to methods for preventing the germination of seeds of undesirable plants and for preventing the growth of emerging seedlings of said plants. In another aspect, this invention relates to certain substituted α-halo-N-naphthylacetamides as new compounds.

In recent years, the use of chemicals for affecting plant systems has found wide-spread acceptance among agriculturalists. For example, chemical compositions have been applied to fully developed vegetation to destroy the same in either a selective or non-selective manner. It is relatively easy to destroy the aerial portion of developed vegetation because the vegetation is brought into direct contact with the herbicide composition; however, it is sometimes more difficult to achieve a lethal affect on germinating seeds lying in the soil and seedlings emerging from the soil. Destruction of germinating seeds and emerging seedlings is important in preventing regrowth from the plants after the herbicide composition has either been washed away by rainfall or dissipated by other actions. Unfortunately, it is usually necessary to use an excessive amount of the herbicidal composition in order to affect the germinating seeds and emerging seedlings and thereby achieve long-lasting plant control. The extended control of plant life during the growth of desirable plants is very often involved in preventing the growth of certain undesirable grasses and weeds, such as crab grass and foxtail. Obviously, a more bountiful growth of desirable grasses and crop plants will result if growth of these undesirable weeds and grasses is prevented before the soil is depleted of moisture and nutrients.

I have discovered, much to my surprise, that the α-haloacetamides having a naphthyl substituent substituted on the amide nitrogen atom are very effective herbicides, having high unit activities and wide plant spectrums.

An object of this invention is to provide novel herbicidal compositions containing as an essential ingredient an α-haloacetamide having a naphthyl substituent on the amide nitrogen atom.

Another object of this invention is to provide novel herbicidal compositions having a high unit activity and a wide plant spectrum at low rates of application.

Another object of this invention is to provide novel herbicidal compositions useful for soil sterilization at low rates of application.

Another object of this invention is to provide novel herbicidal compositions which exhibit selectivity in affecting certain undesirable plant systems without affecting desirable plant systems.

Another object of this invention is to provide methods for the suppression and control of vegetation.

Another object of this invention is to provide methods for the suppression and control of undesirable vegetation growing intermingled with desirable vegetation.

Another object of this invention is to provide methods for preventing the germination of seeds of undesirable plants and for preventing the growth of undesirable emerging seedlings in soil which is planted with seeds of desirable vegetation.

Another object of this invention is to provide as new compounds certain α-haloacetamides having a naphthyl substituent on the amide nitrogen atom.

Other aspects, objects, and advantages of this invention will be apparent from a consideration of the accompanying disclosure and the appended claims.

According to the present invention, there are provided herbicidal concentrate compositions comprising a herbicide adjuvant and an α-haloacetamide of the formula

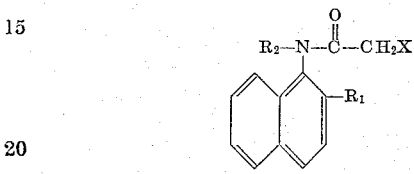

wherein $R_1$ is a tertiary alkyl radical having at least 4 carbon atoms, $R_2$ is selected from the group consisting of hydrogen, alkyl and alkenyl radicals, and X is a halogen atom selected from the group consisting of chlorine, bromine, and iodine.

Also, according to the present invention, there are provided herbicidal compositions comprising a carrier, a herbicide adjuvant and a toxic or growth-inhibiting amount of an α-haloacetamide of the formula as described above.

Also, according to the present invention, there are provided methods for affecting plant systems, including fully developed vegetation as well as germinating seeds and emerging plant seedlings, in a manner to destroy said vegetation and to prevent the growth of said seeds and said emerging seedlings by the application of a toxic or growth-inhibiting amount of an α-haloacetamide of the formula as described above.

Further, according to the present invention, there are provided, as new compounds, α-haloacetamides of the formula as described above.

The α-haloacetamides of this invention have a naphthyl substituent substituted on the amide nitrogen atom. The naphthyl substitutent is substituted in the ortho position with respect to the amide nitrogen atom with a tertiary alkyl radical, $R_1$ in the formula above, having at least 4 carbon atoms and, preferably, not more than 10 carbon atoms. This tertiary alkyl radical may also have further chain branching. Examples of some suitable tertiary alkyl radicals include: tert-butyl, tert-amyl, 1,1,2 - trimethylpropyl, 1,1-dimethylbutyl, 1,1-dimethylamyl, 1,1,2-trimethylbutyl, 1,1,3-trimethylbutyl, 1,1,3,3-tetramethylbutyl, 1,1,2,3-tetramethylbutyl, 1,1,2,2-tetramethylbutyl, and 1,1-dimethyloctyl groups.

The amide nitrogen atom, if desired, may also be substituted with either an alkyl on an alkenyl radical of not more than 6 carbon atoms. These radicals may have either a straight chain or a branched chain configuration, including secondary and tertiary groups. Examples of suitable alkyl radicals include methyl, ethyl, isopropyl, n-butyl, sec-butyl, tert-butyl, n-amyl and n-hexyl. Examples of suitable alkenyl radicals include allyl, vinyl, crotyl, and methallyl.

The halogen substituent on the α-carbon atom of the haloacetamide, identified by X in the formula above, may be either a chlorine, bromine, or iodine atom.

The α-haloacetamides of this invention may in general be prepared by haloacetylation of suitable naphthylamines, which may be prepared for example, by the process disclosed in application S.N. 852,632, filed November 13, 1959, now U.S. Patent 3,170,956, from a naphthylamine and a branch-chain olefin. The haloacetylating agent is preferably either a haloacetic anhydride, such as chloroacetic anhydride or a haloacetyl halide, such as chloroacetyl chloride, bromoacetyl bromide, or the like.

The haloacetylation reaction is preferably conducted in the presence of a suitable liquid reaction medium. The liquid reaction medium must be anhydrous if the acetylating agent is a haloacetic anhydride; however, either anhydrous reaction mediums or mediums containing water can be used with haloacetyl halide acetylating agents. Examples of some suitable reaction mediums for use with either acetylating agent include benzene, diethyl ether, hexane, methylethyl ketone, chlorobenzene, toluene, chloroform, and the xylenes. Since an acid or hydrogen halide is eliminated in the haloacetylation reaction, it is also desirable to have an acid acceptor present in the reaction zone to neutralize the acid formed. Suitable acid acceptors for anhydrous solvent systems, include the naphthylamine reactants, which may be present in the reaction zone in an amount greater than that required for the acetylation, tertiary amines, and pyridine. Acid acceptors in aqueous solvent systems include alkali or alkaline earth hydroxides and alkali or alkaline earth metal carbonates or bicarbonates.

The haloacetylation reaction is generally carried out at a temperature which is below room temperature, preferably in the range of from 0° C. to 15° C. It is not usually desirable to carry out the reaction at a temperature above room temperature because hydrolysis of the haloacetyl halide takes place and the reaction rate is excessively high. It is generally preferable to carry out the reaction at atmospheric pressure although sub-atmospheric pressure and super-atmospheric pressure can be used. Although the haloacetylation reaction can be carried out using stoichiometric amounts of reactants, it is usually preferable to use from 2 to 5% of an excess of the acetylating agent. The haloacetamide products may be separated from the reaction mixture by methods well known to those skilled in the art, such as by distillation or by fractional crystallization from the reaction medium or from solvents in case the desired product is a soluble substance.

The advantages, desirability and usefulness of the present invention are illustrated by the following examples.

EXAMPLE 1

In this example, N-(2-tert-butyl-1-naphthyl)-2-chloroacetamide was prepared by reacting 40 g. (0.2 mole) of 2-tert-butyl-1-naphthylamine dissolved in 100 ml. of benzene with 0.22 mole of chloroacetic anhydride in chloroform. Although the reaction was moderately exothermic, the reaction mixture was heated on a hot plate for an additional 10 minutes. At the end of this time, 150 ml. of water was added to the reaction mixture and the organic solids removed by wet distillation. After standing overnight, the solid material in the reaction mixture was separated and crystallized from dilute methanol to obtain 34 g. of the N-(2-tert-butyl-1-naphthyl)-2-chloroacetamide which is a colorless solid having a melting point of 181–182° C.

EXAMPLE 2

In this example, 2-bromo-N-(2-tert-butyl-1-naphthyl)acetamide was prepared from 2-tert-butyl-1-naphthylamine and bromoacetyl bromide. Into a reaction flask were placed 20 g. of 2-tert-butyl-1-naphthylamine, 9 g. of pyridine and 200 g. of benzene. Thereafter, 20.5 g. of bromoacetyl bromide in 20 ml. of benzene was added slowly with stirring over a period of 15 minutes while maintaining a temperature in the range of 5 to 15° C. Upon completion of the addition of the bromoacetyl bromide, the reaction mixture was stirred for an additional 15 minutes. At the end of this time, 100 ml. of warm water was added to the reaction mixture which was washed twice with hot water and diluted with an equal volume of heptane. Upon crystallization of the liquid there was obtained 20 g. of the 2-bromo-N-(2-tert-butyl-1-naphthyl)acetamide which is a buff-colored solid having a melting point of 178–180° C. Analysis of this product was found to be 24.98% bromine as compared with the calculated value of 24.95% bromine.

EXAMPLE 3

In this example, N-allyl-N-(2-tert-butyl-1-naphthyl)-2-chloroacetamide was prepared from N-allyl-2-tert-butyl-1-naphthylamine and chloroacetyl chloride. Into a reaction flask were placed 88 g. (0.35 mole) of N-allyl-2-tert-butyl-1-naphthylamine, 400 g. of benzene, and 40 g. of pyridine. Thereafter, 44 g. (0.38 mole) of chloroacetyl chloride was added slowly with stirring over a period of 30 minutes while maintaining the temperature in the range of 12–20° C. Upon completion of the addition of the chloroacetyl chloride, the reaction mixture was stirred an additional 5 minutes. At the end of this time, 250 ml. of water was added to the reaction mixture. The oil layer which formed was separated and washed first with 300 ml. of 3% hydrochloric acid and then twice with warm water. The solvents were removed by evaporating under a hood. Thereafter, 200 ml. of heptane was added to the syrup obtained from the evaporation and the solid material present in the mixture filtered-off and washed with pentane. The filtrate and washings were evaporated under a hood and diluted with heptane. This solution was cooled to crystallize the product which was recrystallized from 80% methanol to obtain 41 g. of the N-allyl-N-(2-tert-butyl-1-naphthyl)-2-chloroacetamide which is a tan-colored solid material having a melting point of 78–80° C. Analysis of this product was found to be 11.6% chlorine as compared with the calculated value of 11.23% chlorine.

EXAMPLE 4

In this example, N-allyl-2-bromo-N-(2-tert-butyl-1-naphthyl)acetamide was prepared from N-allyl-2-tert-butyl-1-naphthylamine and bromoacetyl bromide. Into a reaction flask were placed 45 g. (0.19 mole) of N-allyl-2-tert-butyl-1-naphthylamine, 30 g. of potassium carbonate, 100 ml. of water and 250 ml. of benzene. Thereafter, 41 g. of bromoacetyl bromide was added slowly with stirring to the reaction flask over a period of one-half hour while maintaining the temperature at 5–10° C. Upon completion of the addition of the bromoacetyl bromide, the reaction mixture was stirred for a few minutes and washed with warm water. The solvents were removed by evaporation under a hood and the residue obtained diluted with heptane. Crystallization was effected by cooling and the product obtained was recrystallized from dilute methanol to obtain 41 g. of the N-allyl-2-bromo-N-(2-tert-butyl-1-naphthyl)acetamide which is a pale tan-colored solid material having a melting point of 90–94° C. Analysis of this product was found to be 42.4% bromine as compared with the calculated value of 22.18% bromine.

EXAMPLE 5

In this example, the pre-emergent herbicidal ratings of some of the substituted α-halo-N-naphthylacetamides of this invention were determined in greenhouse tests in which a specific number of seeds of 12 different plants, each representing a principal botanical type, were planted in greenhouse flats. A good grade of top soil was placed in either 9½″ x 5¾″ x 2¾″ or 9″ x 13″ x 2″ aluminum pans and compacted to a depth of ⅜ inch from the top of the pan. On top of the soil were placed five seeds of each of radish, morning glory, and tomato; 10 seeds of each of sugar beet, sorghum, and bromegrass; 20 seeds of each of wild buckwheat, giant foxtail, ryegrass, and wild oat; approximately 20 to 30 (a volume measure) of each of pigweed and crabgrass; and either 2 or 3 seeds of soybean. Two different type plantings were made; one wherein the herbicidal composition was applied to the surface of the soil and the other wherein the composition was admixed with or incorporated in the top layer of soil. In the surface-application plantings, the seeds were arranged with 3 soybean seeds across the center of the large aluminum pan, the monocotyledon or grass seeds scattered randomly over one-third of the soil surface, and the dicotyledon or broadleaf seeds scattered randomly over the remaining one-third of the soil surface at the other end of the pan. The seeds were then covered with ⅜ inch of prepared soil mixture and the pan leveled. In the soil-incorporation plantings, 450 g. of prepared soil mixture was blended with the herbicide composition in a separate mixing container for covering the seeds which were planted in the smaller of the two aluminum pans. The seeds in this planting were arranged with a soybean seed planted in diagonal corners and the monocotyledon seeds and the dicotyledon seeds each scattered randomly over one-half of the soil surface. The herbicide-incorporated soil mixture was used to cover the seeds. The herbicide composition was applied in the surface-application plantings prior to the watering of the seeds. This application of the herbicide composition was made by spraying the surface of the soil with an acetone solution containing a sufficient quantity of the candidate chemical to obtain the desired rate per acre on the soil surface. The watering of the seeds in both type plantings was accomplished by placing the aluminum pans in a sand bench having ½-inch depth of water thereon and permitting the soil in the pans to absorb moisture through the perforated bottom of the pans.

The planted pans were thereafter placed on a wet sand bench in a greenhouse and maintained there for 14 days under ordinary conditions of sunlight and watering. At the end of this time, the plants were observed and the results recorded by counting the number of plants of each species which germinated and grew. The herbicidal rating was obtained by means of a fixed scale based on the average percent germination of each seed lot. The herbicidal ratings are defined as follows:

No phytotoxicity _____ 0
Slight phytotoxicity _____ 1
Moderate phytotoxicity _____ 2
Severe phytotoxicity _____ 3

The pre-emergent herbicidal activity of some of the substituted α-halo-N-naphthylacetamides of this invention are recorded in Table I for various application rates of the α-haloacetamide in both surface and soil-incorporated applications. In Table I, the various seeds are represented by letters as follows:

General grass _____ A
General broadleaf _____ B
Morning glory _____ C
Wild oats _____ D
Bromegrass _____ E
Ryegrass _____ F
Radish _____ G
Sugar beet _____ H
Foxtail _____ I
Crabgrass _____ J
Pigweed _____ K
Soybean _____ L
Wild buckwheat _____ M
Tomato _____ N
Sorghum _____ O Individual injury ratings for each plant type are reported in Table I. In addition, the total injury rating for all grass plants and the total injury for all broadleaf plants are also reported in Table I. For grasses, the maximum total is 18 for the 6 grass plants at ratings of 3. For broadleafs, the maximum total is 21 for the 7 broadleaf plants at ratings of 3.

*Table I*

PRE-EMERGENCE HERBICIDAL ACTIVITY OF THE SUBSTITUTED α-HALO-N-NAPHTHYLACETAMIDES

| Compound | Rate, lb./Acre | Plant Type | | | | | | | | | | | | | | Total Injury Rating | | Comments |
|---|---|---|---|---|---|---|---|---|---|---|---|---|---|---|---|---|---|---|
| | | A | B | C | D | E | F | G | H | I | J | K | L | M | N | O | Grass | Broadleaf | |
| N-(2-tert-Butyl-1-naphthyl)-2-chloroacetamide | 5 | 3 | 0 | 1 | 2 | 2 | 3 | 0 | 0 | 3 | 3 | 2 | ---- | 0 | 1 | 3 | 16 | *4 | (¹) |
| | 0.25 | 2 | 0 | 0 | 0 | 0 | 3 | 0 | 0 | 3 | 3 | 2 | ---- | 0 | 0 | 1 | 10 | *2 | (¹) |
| | 0.15 | 2 | 0 | 0 | 0 | 2 | 2 | 0 | 0 | 3 | 3 | 2 | 0 | 0 | 0 | 0 | 10 | 2 | (²) |
| 2-Bromo-N-(2-tert-butyl-1-naphthyl) acetamide | 5 | 2 | 0 | 0 | 0 | 0 | 3 | 0 | 1 | 3 | 3 | 1 | 0 | 0 | 2 | 3 | 12 | 4 | (¹) |
| N-Allyl-N-(2-tert-butyl-1-naphthyl)-2-chloroacetamide | 5 | 3 | 1 | 0 | 2 | 1 | 2 | 0 | 2 | 3 | 3 | 3 | 0 | 0 | 3 | 3 | 14 | 8 | (¹) |
| | 1 | 2 | 0 | 0 | 0 | 0 | 3 | 0 | 0 | 3 | 3 | 0 | 0 | 0 | 0 | 2 | 11 | 0 | (²) |
| N-Allyl-2-bromo-N-(2-tert-butyl-1-naphthyl)acetamide | 5 | 3 | 0 | 0 | 2 | 0 | 3 | 0 | 0 | 3 | 3 | 3 | 0 | 0 | 2 | 3 | 14 | 5 | (¹) |
| | 1 | 3 | 0 | 0 | 2 | 2 | 3 | 0 | 0 | 3 | 3 | 2 | 0 | 0 | 0 | 3 | 16 | 2 | (²) |

*One species missing.
¹ Surface application.
² Incorporated in soil.

The data in Table I illustrate the general herbicidal activity as well as the selective herbicidal activity of some of the substituted α-halo-N-naphthylacetamides of this invention. It will be noted that haloacetamides substituted with a naphthyl group on the amide nitrogen atom demonstrate very outstanding general herbicidal activity at low rates of application. Thus, these α-haloacetamides are particularly useful in soil sterilization applications. It will also be noted from the data in Table I that unusual grass specificity can be obtained at lower levels of application. Such grass specificity is achieved at extremely low application rates, for example, at rates as low as 0.15 lb. per acre with N-(2-tert-butyl-1-naphthyl)-2-chloroacetamide, so that very economical treatment is possible. The three botanical types or genera of grasses effectively controlled by the substituted α-halo-N-naphthylacetamides of this invention embrace a large number of undesirable plants, or weeds, frequently found in vegetable crops. But these α-halo-acetamides are not limited to removing grasses from broadleaf plants, since the selective action is such that certain genera of grasses can be removed from corn, which is also a genus of grass. These α-haloacetamides are also effective in killing nut grass, i.e., *Cyperus rotundus* and *Cyperus esculentus*.

EXAMPLE 6

In this example, the contact herbicidal activity of an α-haloacetamide of this invention was determined in greenhouse tests. The α-haloacetamide to be tested was applied in spray form to 21-day old specimens of the same grasses and broadleaf plants as used in the pre-emergent tests described in Example 5. The same number of seeds of the same plants used in Example 5 were planted in the 9½″ x 5¾″ x 2¾″ aluminum pans arranged in the same manner with a soybean seed in diagonal corners as described in Example 5. After the plants were 21-days old, each aluminum pan was sprayed with 6 ml. of a 0.5% concentration solution of the candidate chemical, corresponding to a rate of approximately 9 lbs. per acre. This herbicidal solution was prepared from 1.5 ml. of a 2% solution of the candidate compound in acetone, 0.2 ml. of a 3:1 cyclohexanone-emulsifying agent mix, and sufficient water to make a volume of 6 ml. The emulsifying agent was a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants were then observed 14 days later. A general grass rating of 3 and a general broadleaf rating of 3 were obtained for N-(2-tert-butyl-1-naphthyl)-2-chloroacetamide.

The herbicidal compositions of this invention are either particulate solid (i.e., dusts) or liquid concentrate compositions comprising the active ingredient and either a particulate solid or liquid herbicidal adjuvant which are formulation aids or conditioning agents permitting the concentrate composition to be readily mixed with a suitable solid or liquid carrier in the field for application of the active ingredient on soil or plant surfaces in a toxic concentration in a form which enables prompt assimilation by the germinating seeds, emerging seedlings, or full grown plants. Thus, the herbicidal compositions of this invention include not only the concentrate compositions comprising the active ingredient and the herbicidal adjuvant but also herbicidal toxicant compositions applied in the field comprising the concentrate composition (i.e., active ingredient plus herbicidal adjuvant) and the carrier.

As demonstrated in the examples above, quite different effects can be obtained by modifying the method of use of the herbicidal composition of this invention. Thus, unusual grass specificity can be achieved at lower levels of application whereas at higher levels of application a more general herbicidal effect or soil sterilization takes place. Therefore, an essential part of this invention is the formulation of the herbicidal composition so as to permit uniform predetermined application of the composition to the plant environment to produce the desired effect.

Herbicidal adjuvants useful in preparing the concentrate compositions and, therefore, the herbicidal toxicant compositions applied to the soil or plants, include particulate solid or liquid extending agents such as solvents or diluents within which the active ingredient is dissolved or suspended, wetting or emulsifying agents which serve in providing uniform dispersions or solutions of the active ingredient in the extending agents, and adhesive agents or spreading agents which improve the contact of the active ingredient with the soil or plant surfaces. All herbicidal compositions of this invention include at least one of the above types of herbicidal adjuvants and usually include an extending agent and a wetting or emulsifying agent because of the nature of the physical properties of the α-haloacetamides of this invention.

In general, the α-haloacetamides of this invention are insoluble in water and are not readily soluble in many organic solvents. Therefore, the choice of a liquid extending agent is somewhat limited if it is desired that the active ingredient be in solution in the extending agent. The active ingredient need not be dissolved in the extending agent but may merely be dispersed or suspended in the extending agent as a supension or emulsion. Also, the α-haloacetamides may first be dissolved in a suitable organic solvent and the organic solution of the active ingredient then incorporated in water or an aqueous extending agent to form a heterogenous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flash points above about 80° F., particularly kerosene), and the like. Where true solutions are desired, mixtures of organic solvents have been found to be useful, for example, 1:1 and 1:2 mixtures of xylene and cyclohexanone.

Solid extending agents in the form of particulate solids are very useful in the practice of the present invention because of the low solubility properties of the α-haloacetamides of this invention. In using this type of extending agent, the active ingredient is either adsorbed or dispersed on or in the finely-divided solid material. Preferably the solid extending agents are not hygroscopic but are materials which render the composition permanently dry and free flowing. Suitable solid extending agents include the natural clays, such as china clays, the bentonites and the attapulgites; other minerals in natural state, such as talc, pyrophyllite, quartz, diatomaceous earth, fuller's earth, chalk, rock phosphate, kaolin, kieselguhr, volcanic ash, salt, and sulfur; the chemically modified minerals, such as acid-washed bentonite, precipitated calcium phosphate, precipitated calcium carbonate, calcined magnesia, and colloidal silica; and other solid materials such as powdered cork, powdered wood, and powdered pecan or walnut shells. These materials are used in finely-divided form, at least in a size range of 20–40 mesh and preferably in much finer size.

The particulate solid concentrate compositions are applied to the soil by admixture at the time of application with a particulate solid carrier material. If desired, this concentrate composition can also be applied as a wettable powder using a liquid carrier material. When used by this method, a wetting agent or surface active agent is added to the concentrate composition in order to render the particulate solid extending agent wettable by water to obtain a stable aqueous dispersion or suspension suitable for use as a spray. Also, the extending agent applied as a wettable powder is used in very finely-divided form, preferably in a size as small as 100 mesh or smaller.

The surface active agent, that is the wetting, emulsifying, or dispersion agent, used in the herbicidal composition of this invention to serve in providing uniform dispersions of all formulation components of both liquid and dust types in both the concentrate compositions and the toxicant compositions applied, may be either anionic, cationic, or non-ionic types, including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, and mineral oils, quaternary salts or high molecular weight acids; rosin soaps, such as salts of abietic acid; sulfuric acid salts of high molecular weight organic compounds; algin soaps; ethylene oxide condensated with fatty acids, alkyl phenols and mercaptans; and other simple and polymeric composition having both hydrophilic and hydrophobic functions.

The herbicidal concentrate compositions of this invention ordinarily have the active ingredient and the surface active agent present in higher concentrations than the toxicant compositions applied in the field so that upon dilution with the liquid or solid carrier, compositions containing optimum proportions of active ingredient and surface active agent are prepared to obtain uniform distribution and to maintain the active ingredient in a form which enables the prompt assimilation by the plant.

The liquid concentrate compositions of this invention preferably comprise 5% to 95% by weight of the active ingredient and the remainder the herbicidal adjuvant, which may be solely liquid extending agent or surface active agent (including adhesive agent), but preferably is a combination of liquid extending agent and surface active agent. Preferably, the surface active agent comprises from 0.1% to 15% by weight of the total concentrate composition. The remainder of the composition is the liquid extending agent.

Use of the surface active agent is necessary in the formulation of liquid concentrate compositions in order to obtain a composition containing a sufficient concentration of the difficultly soluble α-haloacetamide in the liquid extending agent. However, the liquid extending agent must be selected not only on the basis of the amount of the α-haloacetamide dissolved but also upon the basis of the solution temperature of the total composition. Thus, in some formulations, a particular combination of solvents give a sufficiently low solvent temperature but the amount of the α-haloacetamide dissolved or dispersed in the mixture is insufficient and a suitable surface active agent must be selected in order that more α-haloacetamide can be dispersed in the composition. Preferably, the concentrate composition has a solution temperature below 0° C. although compositions having solution temperatures as high as 20° C. can be used.

The concentration of α-haloacetamide in the particulate solid or dust concentrate composition of this invention may vary over wide ranges depending upon the nature of the solid extending agent and the intended use of the composition. Since the α-haloacetamides of this invention have very high toxicities and are applied at very low rates in order to obtain selectivity, the concentration of the active ingredient in the dust composition may be very low and may comprise as little as 1% or less by wt. of the total dust composition. By contrast, when the dust composition is to be used for soil sterilization, it may be desirable to have a very high concentration of active ingredient and for such use the active ingredient may comprise as much as 5% to 98% by wt. of the total composition. The remainder of the composition is the herbicidal adjuvant which is usually only the particulate solid extending agent. Thus, the surface active agent is not usually required in dust concentrate compositions although it can be used if desired. However, if the dust concentrate composition is to be applied as a wettable powder, surface active agent must be added to the concentrate composition and ordinarily the amount of surface active agent will be in the range of 0.1% to 15% by wt. of the composition.

The carrier material, used for the uniform distribution of the α-haloacetamide in an herbicidally effective amount to inhibit the growth of either all or selected plants, may be either a liquid or a particulate solid material. The liquid and solid extending agents used to prepare the concentrate composition may also be used as the carrier; however, the use of these materials as a carrier is often not economical. Therefore, water is the preferred liquid carrier, both for use with the liquid concentrate composition and the wettable powder concentrate. Suitable particulate solid carriers include the particulate extending agents noted above as well as the solid fertilizers such as ammonium nitrate, urea, and superphosphate, as well as other materials in which plant organisms may take root and grow, such as compost, manure, humus, sand and the like.

The liquid and dust concentrate compositions of this invention can also contain other additaments such as fertilizer and pesticides. Also, these additaments may be used as, or in combination with, the carrier materials.

The herbicidal compositions of this invention are applied to the plant systems in the conventional manner. Thus, the dust and liquid compositions may be applied to the foliage of growing plants by the use of power-dusters, broom, and hand sprayers, and spray-dusters. The compositions can also be very suitably applied from airplanes as a dust or a spray because the herbicidal compositions of this invention are effective in very low dosages. In order to prevent growth of germinating seeds or emerging seedlings, the dust and liquid compositions are applied to the soil according to conventional methods, and, preferably, distributed in the soil to a depth of at least ½ inch below the soil surface. It is not absolutely necessary that the herbicidal compositions be admixed with the soil particles and these compositions can be applied merely by spraying or sprinkling onto the surface of the soil. The herbicidal compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by the usual discing, dragging, or mixing operations.

The application of a growth-inhibiting amount or toxic amount of the α-haloacetamide to the plant system is essential in the practice of the present invention. The exact dosage to be applied is dependent not only upon the specific α-haloacetamide but also upon the particular plant species to be controlled and the stage of growth thereof as well as the part of the plant to be contacted with the toxicant. In non-selective foliage treatments, the herbicidal compositions of this invention are usually applied at a rate sufficient to obtain from 5 to 50 lbs. of α-haloacetamide per acre but lower or higher rates might be applied in some cases. In non-selective pre-emergent treatments, these herbicidal compositions are usually applied at a somewhat lower rate than in foliage treatments but at a rate which is ordinarily within the same general range; that is, at a rate in the range of 1 to 25 lbs. per acre. However, because of the unusually high unit activity possessed by the α-haloacetamides of this invention, soil sterilization is ordinarily accomplished at a rate of application in the range of 3 to 9 lbs. per acre. In selective pre-emergent applications to the soil, a dosage of from 0.15 to 5 lbs. of active ingredient per acre is usually employed but lower or higher rates may be necessary in some instances. It is believed that one skilled in the art can readily determine from this disclosure, including the examples, the optimum rate to be applied in any particular case.

Although the active ingredient in the herbicidal compositions of this invention is preferably a substituted α-halo-N-naphthylacetamide as described in this specification, other α-haloacetamides having other nuclear alkyl and halo substitution and/or having no amide nitrogen substitution may also be present in the herbicidal compositions and contribute to the activity of the composition. However, the essential active ingredient of the herbicidal compositions of this invention is the substituted α-halo-N-naphthylacetamide disclosed in this specification. Of course, one skilled in the art will understand that mixtures of various substituted α-halo-N-naphthylacetamides can also be used.

Reasonable variation and modification of the invention as described are possible, the essence of which is that there have been provided (1) herbicidal concentrate compositions comprising a herbicidal adjuvant and, as an essential active ingredient, a substituted α-halo-N-naphthylacetamide, (2) herbicidal toxicant compositions comprising a herbicidal adjuvant, a carrier, and, as an essential active ingredient, a toxic or growth-inhibiting amount of a substituted α-halo-N-naphthylacetamide. (3) methods for suppression and control of undesirable vegetation, including full grown plants as well as germinating seeds and emerging seedlings, by the application of a substituted α-halo-N-naphthylacetamide thereto, and (4) certain substituted α-halo-N-naphthylacetamides as new compounds.

I claim:
1. An α-haloacetamide of the formula

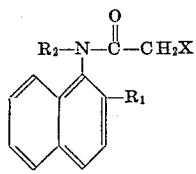

wherein $R_1$ is tertiary alkyl having at least 4 carbon atoms and not more than 10 carbon atoms, $R_2$ is selected from the group consisting of hydrogen, alkyl and alkenyl having not more than 6 carbon atoms, and X is a halogen atom selected from the group consisting of chlorine, bromine and iodine.

2. An α-haloacetamide of claim 1 wherein $R_2$ is hydrogen and X is the chlorine atom.

3. An α-haloacetamide of claim 1 wherein $R_2$ is hydrogen and X is the bromine atom.

4. An α-haloacetamide of claim 1 wherein $R_2$ is alkenyl having not more than 6 carbon atoms and X is the chlorine atom.

5. An α-haloacetamide of claim 1 wherein $R_2$ is alkenyl having not more than 6 carbon atoms and X is the bromine atom.

6. N-(2-tert-butyl-1-naphthyl)-2-chloroacetamide.
7. 2-bromo-N-(2-tert-butyl-1-naphthyl)acetamide.
8. N-allyl-N-(2-tert-butyl-1-naphthyl-) - 2 - chloroacetamide.
9. N-allyl-2-bromo-N-(2-tert-butyl - 1 - naphthyl)acetamide.

References Cited by the Examiner

UNITED STATES PATENTS

| | | | |
|---|---|---|---|
| 2,944,081 | 6/1960 | Wright et al. | 260—562 |
| 2,983,755 | 5/1961 | Kollonitsch et al. | 260—562 |
| 2,992,091 | 6/1961 | Harman et al. | 71—2.6 |
| 2,992,913 | 6/1961 | Koloman | 71—2.6 |

OTHER REFERENCES

Grasshof: German application 1,062,250, printed July 30, 1959.

Leonard et al.: "J. of Bacteriology," vol. 57, pages 339 to 347 (1949).

WALTER A. MODANCE, *Primary Examiner.*

LEWIS GOTTS, *Examiner.*